United States Patent
Epple et al.

(10) Patent No.: US 11,607,951 B2
(45) Date of Patent: Mar. 21, 2023

(54) POWER TAKE-OFF DEVICE FOR A MOTOR VEHICLE AND MOTOR VEHICLE DRIVE TRAIN

(71) Applicant: ZF Friedrichshafen AG, Friedrichshafen (DE)

(72) Inventors: Michael Epple, Bad Waldsee (DE); Frank Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 3 days.

(21) Appl. No.: 17/193,082

(22) Filed: Mar. 5, 2021

(65) Prior Publication Data
US 2021/0339625 A1 Nov. 4, 2021

(30) Foreign Application Priority Data

May 3, 2020 (DE) ...................... 10 2020 202 807.9

(51) Int. Cl.
*B60K 17/28* (2006.01)
*B60K 25/06* (2006.01)
(Continued)

(52) U.S. Cl.
CPC .............. *B60K 17/28* (2013.01); *B60K 25/06* (2013.01); *F16D 11/14* (2013.01); *F16H 57/02* (2013.01);
(Continued)

(58) Field of Classification Search
CPC ............... F16D 2011/006; F16D 11/14; F16D 2057/02043; F16D 2057/02026
See application file for complete search history.

(56) References Cited

U.S. PATENT DOCUMENTS 2,158,483 A 5/1939 Peterson
2,168,033 A * 8/1939 Johnston ................ B60K 17/28
74/15.84

(Continued)

FOREIGN PATENT DOCUMENTS

CN 107985055 A 5/2018
DE 920 289 11/1954
(Continued)

OTHER PUBLICATIONS

Machine translation of DE1254026 and obtained from espacenet (Year: 2022).*

(Continued)

*Primary Examiner* — Stacey A Fluhart
(74) *Attorney, Agent, or Firm* — Finch & Maloney PLLC

(57) ABSTRACT

A power take-off device for a motor vehicle has a drive input, two drive outputs and a clutch. The first drive output channels drive torque from the power take-off device to propel the motor vehicle. The second drive output channels drive torque from the power take-off device to an auxiliary unit to drive the auxiliary unit. The clutch selectively couples the drive input to the first and second drive outputs. The clutch has three shift positions. In the first shift position, the drive input is coupled to the first drive output and decoupled from the second drive output. In the second shift position, the drive input is coupled to the second drive output and decoupled from the first drive output. In the third shift position, the drive input is coupled to both the first and second drive outputs.

9 Claims, 2 Drawing Sheets

(51) Int. Cl.
*F16D 11/14* (2006.01)
*F16H 57/02* (2012.01)
(52) U.S. Cl.
CPC .............. *F16H 2057/02026* (2013.01); *F16H 2057/02043* (2013.01)

(56) References Cited

U.S. PATENT DOCUMENTS

| | | | | |
|---|---|---|---|---|
| 2,287,302 A | * | 6/1942 | Gifford | .................. B60K 17/02 74/15.84 |
| 6,966,243 B1 | | 11/2005 | Liao | |
| 2019/0193560 A1 | | 6/2019 | Trübenbach et al. | |

FOREIGN PATENT DOCUMENTS

| | | | | |
|---|---|---|---|---|
| DE | 1 254 026 | | 11/1997 | |
| DE | 10 2016 212 209 A1 | | 1/2018 | |
| WO | WO-2014192772 A1 | * | 12/2014 | ............. F16D 21/04 |

OTHER PUBLICATIONS

German Search Report Corresponding to 10 2020 202 807.9 dated Oct. 28, 2020.

* cited by examiner

POWER TAKE-OFF DEVICE FOR A MOTOR VEHICLE AND MOTOR VEHICLE DRIVE TRAIN

This application claims priority from German patent application serial no. 10 2020 202 807.9 filed Mar. 5, 2020.

FIELD OF THE INVENTION

The invention relates to a power take-off for a motor vehicle, and a motor vehicle drive-train.

BACKGROUND OF THE INVENTION

Power take-offs for motor vehicles are already known as such. Typical areas of application for power take-offs are auxiliary aggregates to be driven by the motor vehicle, such as high-pressure pumps for fire-engines, high-pressure sewer flushing and suction vehicles, earth drilling equipment, concrete mixers and concrete pumps.

For example, from DE 10 2016 212 209 A1 a power take-off arrangement with a shifting element is known. The shifting element serves for the optional connection of a driveshaft of the power take-off arrangement to another driveshaft, which is permanently connected to a drive motor. The power take-off arrangement is accommodated inside a transmission housing of a motor vehicle. The power take-off of DE 10 2016 212 209 A1 is a so-termed motor-dependent power take-off. In such a case there is a direct connection to the driveshaft (as a rule the crankshaft) of the drive motor of the vehicle, bypassing a vehicle clutch or a torque converter, so that this power take-off is permanently mechanically connected to the driveshaft.

Other designs of motor vehicle power take-offs are also known. From the documents CN 107 985 055 A and U.S. Pat. No. 6,966,243 A, for example, power take-offs for motor vehicles are known which are arranged on the drive output side and are independent of a transmission of the motor vehicle. In these, a plurality of clutches are in each case provided in order to engage different driving modes of the motor vehicle. Accordingly it is possible both to propel the vehicle and also to power a device of the vehicle such as a pump. Likewise, it is possible to drive only the vehicle or only the device.

SUMMARY OF THE INVENTION

The purpose of the present invention is to improve upon the prior art.

This objective is achieved by virtue of the measures indicated respectively in the independent claims. Preferred embodiments of the invention emerge from the subordinate claims.

According to these, a power take-off device for a motor vehicle is proposed, as well as a motor vehicle drive-train with such a power take-off device.

The power take-off device comprises a drive input, a first drive output, a second drive output and a clutch. The drive input serves to introduce drive torque into the power take-off device. The first drive output serves to channel at least part of the drive torque from the power take-off device to propulsion means of the motor vehicle. In that way the motor vehicle can be propelled by virtue of the drive torque. The second drive output is designed to channel at least part of the drive torque from the power take-off device to an auxiliary unit. In that way the auxiliary unit can be powered by the drive torque. In this case the clutch is designed to couple the drive input optionally to the first drive output and to the second drive output. Thus, with this one clutch the driving mode obtained with the power take-off device can be selected.

The clutch in this case has exactly three, or at least, three shift positions, with which the various coupling modes of the drive input to the two drive outputs can be realized. Thus, all the drive modes of the power take-off device are obtained by means of this one clutch. In particular, the clutch works with interlock. Thus, in all three shift positions the drive torque is transferred with interlock within the clutch, for example by means of clutch claws or teeth.

The clutch can have a synchronization mechanism. However, it can also be designed without synchronization. It is then free from synchronization means of its own for mechanical rotational speed synchronization of the clutch components, for example synchronizing rings. The clutch is actuated in some suitable way, for example electrically, pneumatically, hydraulically, by centrifugal force, or manually.

In the first shift position of the clutch (first drive mode) the drive input is coupled to the first drive output, while the drive input is decoupled from the second drive output. Then, by way of the power take-off device only the propulsion means of the motor vehicle can be driven and the auxiliary unit cannot be driven. Accordingly, the first drive output can be regarded as the main drive output of the power take-off device.

In the second shift position of the clutch (second drive mode) the drive input is coupled to the second drive output, while the drive input is decoupled from the first drive output. Then, the propulsion means of the motor vehicle cannot be driven by the power take-off device and only the auxiliary unit can be driven. Thus, the drive output can be regarded as the auxiliary power take-off or PTO (power take-off) of the power take-off device.

In the third shift position of the clutch (third drive mode) the drive input is coupled both to the first and to the second drive output. Thus, by way of the power take-off device the propulsion means of the motor vehicle and at the same time the auxiliary unit can both be driven.

The clutch can be designed as a 3-way clutch. In that case it has only and exactly the three aforesaid shift positions. However, it can also be provided that there is at least one further (fourth) shift position. This fourth shift position can be a neutral shift position, in which both the first drive output and the second drive output are decoupled. There is then no transfer of torque by the power take-off device to the two drive outputs.

The propulsion means of the motor vehicle are in particular drivable wheels, tires or caterpillar tracks.

The auxiliary unit of the motor vehicle is a device that can be driven with the drive torque delivered by the power take-off device and which does not usually serve to propel the vehicle. The auxiliary unit can be an external unit which is or can be arranged on the motor vehicle. The unit is in particular a pump, for example a hydraulic pump, a water pump or a concrete pump, or else an electric generator, or some other mechanical load such as a conveyor belt or a rotary drive (in particular for a rotating drum or a rotating brush).

The drive input and the first and second drive outputs are each in particular in the form of a rotating shaft (drive input shaft, first drive output shaft, second drive output shaft). These shafts in particular have shaft flanges in order to be coupled to the respective auxiliary unit of the motor vehicle.

During normal operation of the power take-off device, the power flow takes place from the drive input to the first drive output and/or to the second drive output. This corresponds to the normal traction operation of the drive-train. During overdrive operation, however, the power flow in the power take-off device can also be reversed (for a short time).

The motor vehicle is, for example, a passenger car or a truck or a motor bus.

The shift positions of the clutch can be designed as detent positions. Thus, the clutch snaps into the shift position engaged in each case. This prevents inadvertent disengagement or at least makes it more difficult. Preferably, the clutch has a sliding sleeve with exactly three, or at least three detent positions. Each detent position of the sliding sleeve then corresponds to one of the shift positions of the clutch.

Preferably, the power take-off device has a housing. This shields the power take-off device from external environmental conditions such as dust, water or ice, and prevents the escape of lubricant from the power take-off device.

In an embodiment the power take-off device has a housing of its own. In other words, a special housing is provided for the power take-off device. Inside this housing are arranged the clutch and the power transmission means needed for transferring the drive torque between the drive input and the two drive outputs, in particular such as gearwheels and shafts. Thanks to its own housing, the power take-off device can be arranged relatively freely in a drive-train of the motor vehicle. Thereby, the power take-off device can be used independently of a multi-gear transmission possibly also provided in the drive-train. Accordingly the power take-off device can have its own actuator system and/or controls for actuating the clutch, i.e. for engaging the shift positions.

The power take-off device's own housing can be designed to be attached to a separate transmission housing of a multi-gear transmission. For this, special fixing means such as a flange or eyelets are provided on the housing of the power take-off device, in order thereby to be fastened onto the housing of the multi-gear transmission. Such a multi-gear transmission has a plurality of transmission shifting elements and gearwheels for producing different gear ratio steps of the multi-gear transmission that can be engaged selectively, such as a reversing gear and one or more forward gears. Alternatively, the housing of the power take-off device can also be designed for fixing to a frame or chassis of the motor vehicle, to which the housing of the multi-gear transmission is also attached. In this case too, appropriate special fixing means are provided on the housing of the power take-off device for fastening it onto the frame or chassis.

In another embodiment the power take-off device is designed to be arranged inside a housing of the multi-gear transmission. In that case therefore, the power take-off device does not have a housing of its own, but is instead designed to be integrated in the transmission housing of the multi-gear transmission. Thus, a common lubricant and therefore also a common lubricant circuit can be used by the power take-off device and the multi-gear transmission. Likewise, an actuator system and/or a control system of the multi-gear transmission can also be used for actuating the clutch of the power take-off device, i.e. for engaging the shift positions. Thus, as an option, besides the power take-off device, such a multi-gear transmission for a motor vehicle with the transmission housing and the power take-off device arranged inside the transmission housing can be proposed.

Preferably, the power take-off device is designed to be accommodated inside a first space of the transmission housing of the multi-gear transmission. The transmission shifting elements and gearwheels for producing the various and selectively engaged gear ratio steps of the multi-gear transmission are in this case arranged in a second space of the transmission housing. These two spaces are separate from one another. There is therefore an internal functional separation of the multi-gear transmission and the power take-off device. In that way the individual parts can be repaired. Furthermore, a mechanical problem in the multi-gear transmission can thereby have less effect on the function of the power take-off device, and vice-versa. The separation of the two spaces is preferably so designed that lubricant and/or air exchange between the spaces takes place deliberately. In other words there must not be a hermetic separation between the two spaces. The separation is effected in particular by a housing wall between the two spaces in the transmission housing. In this context the housing wall can have functions additional to pure separation, and can in particular support a transmission shifting element and/or a shaft bearing.

Preferably, the power take-off device is designed to be arranged on the multi-gear transmission on the drive output side of the latter. For this purpose the first space in the transmission housing, which is provided for the power take-off device, can be arranged at the output end of the multi-gear transmission. For the same purpose, however, the own housing of the power take-off device can be designed to be fitted on the output side end of the transmission housing of the multi-gear transmission. The branching of the drive torque to the auxiliary unit then takes place in the power flow behind (i.e. after) the multi-gear transmission. Thus, the auxiliary unit can be acted upon at a rotational speed and by a torque that correspond to the drive output rotational speed and drive output torque of the multi-gear transmission. Accordingly, the rotational speed and torque at the auxiliary unit can be adjusted flexibly by shifting the gear ratio steps in the multi-gear transmission. In this embodiment the drive output (drive output shaft) of the multi-gear transmission is coupled to the drive input (drive input shaft) of the power take-off device, preferably coupled directly, or it can be identical therewith.

Preferably, the two drive outputs of the power take-off device are each formed by a drive output shaft. These two drive output shafts can be arranged parallel and laterally offset relative to one another. In that way the power transmission within the power take-off section can take place in a simple manner, for example by means of spur gears. In particular it is provided that the drive output shafts extend on a common side from the power take-off device. In particular, this is done on a side of the power take-off device opposite to the drive input (drive input shaft).

Preferably, for torque transmission from the drive input shaft of the power take-off device to the second drive output shaft of the power take-off device, a first gearwheel and a second gearwheel are provided. In this case the second gearwheel is permanently coupled to the first gearwheel, for example by meshing of the two gearwheels or by a link chain between the gearwheels. The first gearwheel can optionally be coupled to and decoupled from the drive input shaft by means of the clutch. Thus, in the first shift position of the clutch the first gearwheel is decoupled from the drive input shaft, and in the second and third shift positions the first gearwheel is coupled to the drive input shaft. In contrast, the second gearwheel is permanently coupled to the second drive output shaft. The first gearwheel is arranged coaxially on the drive input shaft. In particular, the first gearwheel is supported rotatably on the drive input shaft, for example by means of a radial roller bearing between them.

In this case the clutch is arranged axially between the first gearwheel and the first drive output shaft. In this way the power take-off device can be made compactly. An optionally present connecting shaft between the clutch and the first gearwheel can be in the form of a hollow shaft that extends coaxially with the drive input shaft.

The proposed motor vehicle drive-train serves to drive the propulsion means of the motor vehicle and also to power the auxiliary unit. The latter is or can be arranged on the vehicle. The drive-train comprises the multi-gear transmission and the power take-off device for optionally driving the propulsion means and the auxiliary unit. Thus, by means of the drive-train the auxiliary unit can be operated and at the same time the vehicle can be propelled, and it is also possible only to propel the vehicle and also possible only to operate the auxiliary unit. These driving modes of the motor vehicle are engaged by means of the one clutch of the power take-off device by selecting the corresponding shift position. Thus, as an option a motor vehicle with such a drive-train is also proposed.

To produce the drive torque, which is distributed by way of the power take-off device to the propulsion means of the vehicle and/or to the auxiliary unit, a drive motor is used. This can be an internal combustion engine or an electric motor. Likewise, the drive torque can be produced by a drive aggregate that comprises both an internal combustion engine and an electric motor. The proposed vehicle drive-train can optionally have such a drive motor or such a drive aggregate. In particular this is positioned on the drive input side relative to the multi-gear transmission.

BRIEF DESCRIPTION OF THE DRAWINGS

Below, the invention is explained in greater detail with reference to figures from which further preferred embodiments of the invention can emerge. The figures show, in each case in a schematic representation.

DETAILED DESCRIPTION OF THE PREFERRED EMBODIMENTS

In the figures the same or at least functionally equivalent components are denoted by the same indexes.

Figure 1:
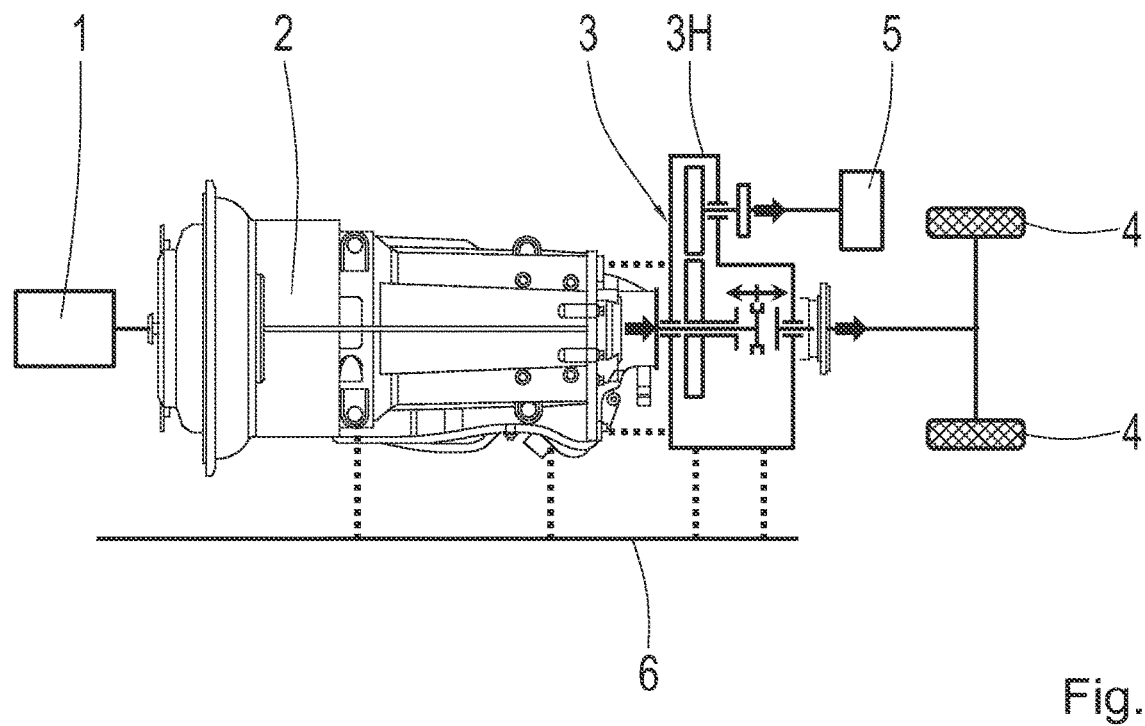
FIG. 1: A motor vehicle drive-train with a power take-off device.
Figure 2:
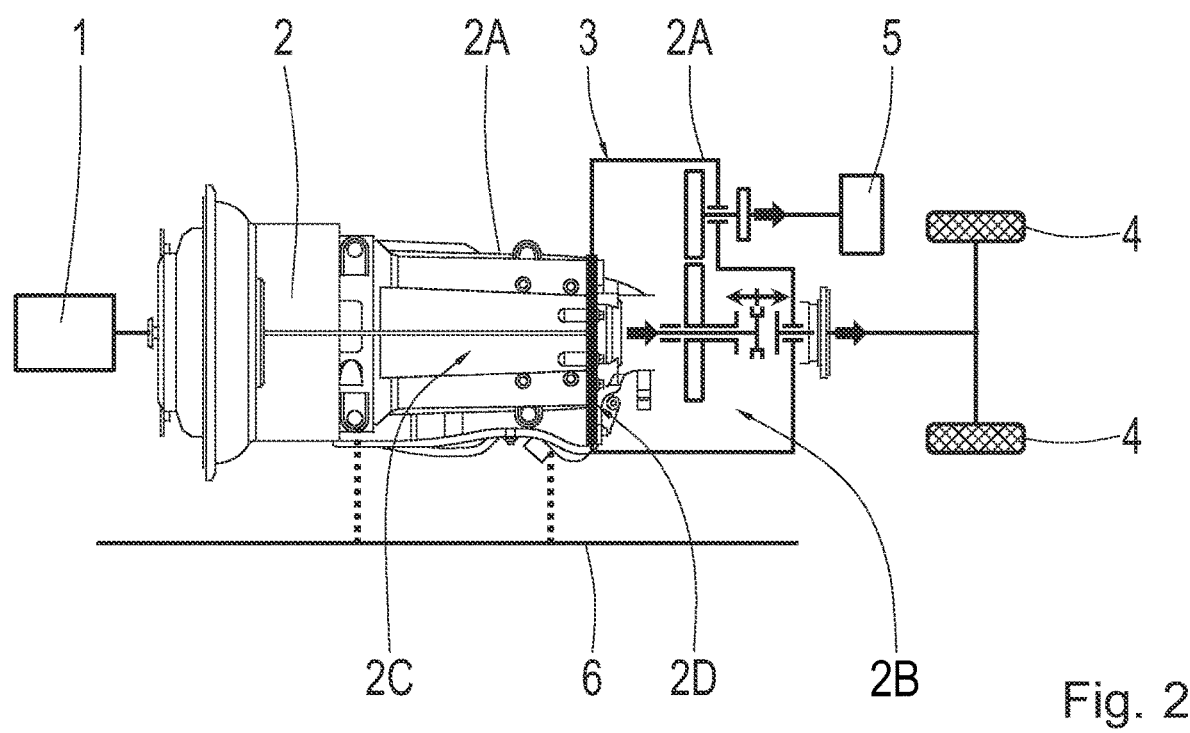
FIG. 2: Another motor vehicle drive-train with another power take-off device.

The motor vehicle drive-train in FIGS. 1 and 2 consists in each case essentially of a drive motor 1, a multi-gear transmission 2, a power take-off device 3 and propulsion means 4. An auxiliary unit 5 to be driven, which can be part of the motor vehicle itself or can be arranged on it, can be coupled to and decoupled from the motor vehicle drive-train by means of the power take-off device for driving purposes. The preferred gearset for the power take-off device 3 in FIG. 1 is shown in greater detail in FIG. 3.

The drive motor 1 serves to produce a drive torque or a mechanical drive input power. This serves—as necessary—to propel the vehicle and—as necessary—to power the auxiliary unit 5. The motor 1 is in particular in the form of an internal combustion engine or an electric motor.

The motor 1 is permanently drivingly coupled to the drive input of the multi-gear transmission 2 or can optionally be coupled to and decoupled from it by means of a separator clutch. The multi-gear transmission 2 has a plurality of gear ratios that can be engaged selectively. Thus, the drive torque delivered by the motor 1 at the drive output of the transmission 2 can optionally be increased or decreased, or its action direction (rotational direction) can be reversed. The transmission 2 is for example an automatic transmission.

The propulsion means 4 are drive-coupled to a first drive output of the power take-off device 3. In FIGS. 1 and 2 these means are depicted, for example, as drive wheels. The coupling takes place by way of appropriately designed driveshafts and if necessary a differential gear system arranged between the drive wheels.

The auxiliary unit 5 is drivingly connected to a second drive output of the power take-off device 3. This is preferably a pump or an electric generator or some other auxiliary unit to be driven, which should when required be able to be driven by the drive torque from the motor 1. Usually, the auxiliary unit 5 serves some purpose other than the propulsion of the vehicle.

The drive input of the power take-off device 3 is drivingly connected to the drive output of the transmission 2. Thus, the drive torque delivered by the motor is transmitted by way of the transmission 2 to and into the power take-off device 3. For that purpose the power take-off device 3 is arranged on the output side of the transmission 2.

The power take-off device 3 has a clutch which can adopt exactly three or at least three shift positions I, II and III. In this way it can be arranged that the power take-off device 3 transmits the drive torque applied to its drive input, selectively:

to the auxiliary unit 5, or
to the propulsion means 4, or
to both the auxiliary unit 5 and the propulsion means 4.

In FIGS. 1 and 2 this is indicated by corresponding arrows at the drive input and the two drive outputs of the power take-off device 3. These three drive modes correspond to the three shift positions I, II and III of the clutch. Thus, the drive modes of the power take-off device 3 can be realized with this one clutch.

Below, the power take-off device 3 will be explained in greater detail with reference to the preferred gearset of the power take-off device 3 in FIGS. 1 and 2, illustrated in FIG. 3.

The clutch of the power take-off device 3 comprises a sliding sleeve 3A, which can be moved to the three shift positions I, II and III. The shift positions are preferably designed as detent positions. The sliding sleeve 3A is moved by an actuator system in a suitable manner, in particular pneumatically, hydraulically or electrically. Manually controlled movement is also possible.

Figure 3:
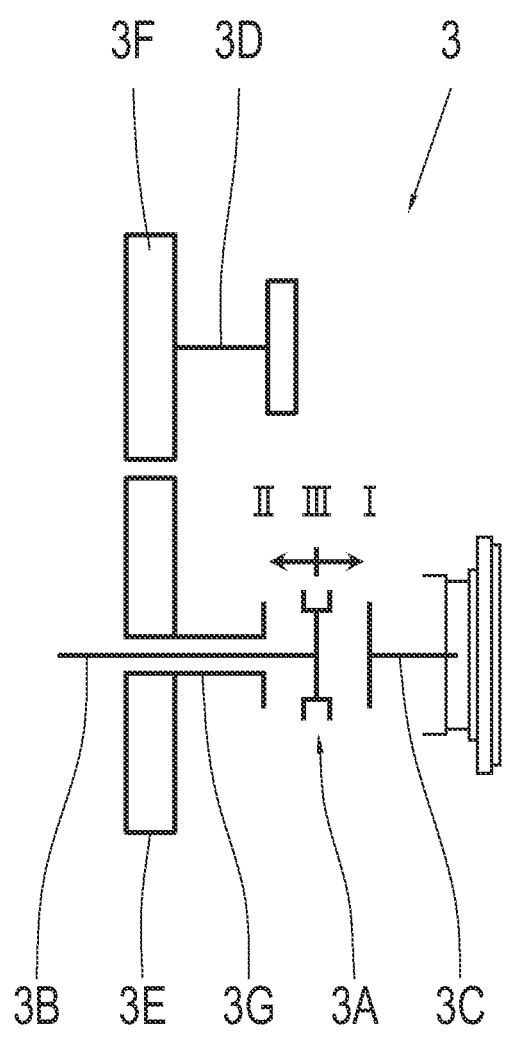
FIG. 3: A gearset for the power take-off device shown in FIGS. 1 and 2.

In the first shift position I, the sliding sleeve 3A is moved to the right in FIG. 3, whereby a driveshaft 3B of the power take-off device 3 used as a drive input is drivingly coupled only to the first drive output shaft 3C of the power take-off device 3 used as the first drive output. Thereby, all of the torque applied at the drive input 3B is transmitted to the first drive output 3C. Since the first drive output 3C is coupled to the propulsion means 4, those means now propel the motor vehicle by virtue of the drive torque applied to them.

The first drive output shaft 3C is arranged coaxially with the drive input shaft 3B. Thus, in the first shift position I, in the simplest case the sliding sleeve 3A bridges an otherwise present gap between the drive input shaft 3B and the drive output shaft 3C.

In the second shift position II, the sliding sleeve in FIG. 3 is moved to the left, whereby the driveshaft 3B used as the drive input is drivingly coupled only to the second drive output shaft 3D of the power take-off device 3 used as the second drive output. Thereby, all of the torque applied at the drive input 3B is transmitted to the second drive output 3D. Since the second drive output 3D is coupled to the auxiliary unit 5, the latter is now operated by the drive torque applied thereto; for example a medium is pumped by the auxiliary unit 5 or electric current is generated.

The drive torque is transmitted from the drive input 3B to the first drive output 3C by a first gearwheel 3E arranged coaxially on the driveshaft 3B. This is permanently coupled to a second gearwheel 3F arranged coaxially with the second drive output shaft 3D. For example, this is because the gearwheels 3E and 3F mesh directly with one another or are permanently coupled to one another indirectly by a link chain. The second gearwheel 3F is permanently and directly coupled to the second drive output shaft 3D. It is possible for the second gearwheel 3F and the second drive output shaft 3D to be made integrally, as one piece. The first gearwheel 3E is preferably mounted rotatably on the driveshaft 3B by a roller bearing.

The first gearwheel 3E can optionally be coupled to and decoupled from the second drive output shaft 3D by means of the clutch/sliding sleeve 3A. In the first shift position I it is decoupled (no torque transmission) and in the second and third shift positions II, III it is coupled (torque transmission). The clutch/sliding sleeve 3A is arranged axially between the first gearwheel 3E and the first drive output shaft 3C. An optional connecting shaft 3G between the clutch/sliding sleeve 3A and the first gearwheel 3E can be in the form of a hollow shaft. The connecting shaft 3G can be made integrally, in one piece with the first gearwheel 3E.

The two drive output shafts 3C, 3D each have a shaft flange to which the propulsion means 4 or the auxiliary unit 5, respectively, are coupled.

In the third shift position III, the sliding sleeve according to FIG. 3 is in a central position between the first and second shift positions I, II, whereby the driveshaft 3B is drivingly coupled to both the first drive output shaft 3C and the second drive output shaft 3D. Thereby, the torque applied at the drive input 3B is transmitted to the first and the second drive outputs 3C, 3D, i.e. correspondingly distributed between them. Accordingly the vehicle is propelled and at the same time the auxiliary unit 5 is driven.

Below, the differences between the drive-trains according to FIG. 1 and FIG. 2 will be explained. These differ essentially in that in FIG. 1 the power take-off device 3 is in a stand-alone form whereas in FIG. 2 it is arranged inside a housing 2A of the multi-gear transmission 2. In both of the cases illustrated the power take-off device 3 is arranged in the drive-train on the drive output side of the multi-gear transmission 2.

In FIG. 1 the power take-off device 3 has a housing 3H of its own. This encloses the elements of the power take-off device 3 shown in FIG. 3. Likewise, the power take-off device 3 then preferably has an actuator system of its own for actuating the clutch 3A. Similarly, the power take-off device 3 can then have electronics (a control unit) of its own for controlling the clutch 3A. In particular, the power take-off device 3 then also has a lubricant supply of its own.

The housing 3H is designed so that the power take-off device 3 can be fitted onto the motor vehicle. Thus, it has appropriate fixing means such as in particular at least one housing flange or fixing eyelets. In FIG. 1 possible fixing connections for fitting the power take-off device 3 by way of its housing 3H are indicated, as examples, by dotted lines. These are for example screw connections that engage, on the one hand, with the fixing means of the power take-off device 3 and, on the other hand, in corresponding fixing means of the multi-gear transmission 2 or of the vehicle.

Accordingly the housing 3H can be designed for fixing onto the multi-gear transmission 2 (see the dotted lines to the multi-gear transmission 2). Alternatively or in addition, however, the housing 3H can also be designed to be fixed to a frame or chassis 6 of the motor vehicle, to which the multi-gear transmission 2 is also fixed (see the dotted lines to the frame/chassis 6).

A particular advantage of the embodiment according to FIG. 1 is that the drive-train has a modular structure, with a clear functional separation of the multi-gear transmission 2 and the power take-off device 3. This can simplify the maintenance and servicing of the drive-train.

In FIG. 2, in contrast, the power take-off device 3 does not have a housing of its own. Instead, the power take-off device 3 is integrated in the transmission housing 2A of the multi-gear transmission 2. Thus, besides the transmission shifting elements and gearwheels of the multi-gear transmission 2 the housing 2A also encloses the elements of the power take-off device 3 shown in FIG. 3. Accordingly, it is possible to use the actuator system and or electronic controls (control unit), in any case already present in the multi-gear transmission 2, for controlling the clutch 3A. In particular, in this case the power take-off device 3 shares a common lubricant supply with the multi-gear transmission 2.

In this case the power take-off device 3 is designed to be arranged inside a first space 2B of the housing 2A. On the other hand, the transmission shifting elements and gearwheels for producing the various gear ratio steps of the multi-gear transmission 2 are accommodated in a second space 2C of the housing 2A. The two spaces 2B, 2C are separated from one another by a housing wall 2D arranged inside the housing 2A. The drive output of the multi-gear transmission 2 passing through the wall 2D can in this case be identical to the drive input of the power take-off device 3.

The power take-off device 3 in the first space 2B is in this case also arranged on the drive output side of the actual multi-gear transmission (transmission shifting elements and gearwheels for producing the various gear ratio steps, in the second space 2C).

The housing 2A is designed so that the multi-gear transmission 2 with the power take-off device 3 can be fixed onto the motor vehicle. It therefore comprises appropriate fixing means, such as in particular at least one housing flange, or fixing eyelets. In FIG. 2 possible fixing connections for attaching the housing 2A to the frame/chassis 6 of the vehicle are indicated, as examples, by dotted lines. These are for example screw connections which engage, on the one hand, in the fixing means of the multi-gear transmission 2 and, on the other hand, in corresponding fixing means of the frame/chassis 6.

The particular advantage of the embodiment according to FIG. 2 is a compact structure of the multi-gear transmission 2 and the power take-off device 3. This reduces the fitting space required.

INDEXES

1 Drive motor
2 Multi-gear transmission
2A housing
2B Space
2C Space
2D Housing wall
3 Power take-off device 3A Clutch, sliding sleeve
3B Drive input, drive input shaft
3C Drive output, drive output shaft
3D Drive output, drive output shaft
3E Gearwheel
3F Gearwheel
3G Connecting shaft
3H Housing
4 Propulsion means, wheel
5 Auxiliary unit
6 Frame, chassis
I, II, III Shift positions

The invention claimed is:

1. A power take-off device for a motor vehicle comprising:
   a drive input,
   a first drive output,
   a second drive output, and
   a clutch,
   the first drive output being designed to channel at least part of a drive torque from the power take-off device to propulsion means of the motor vehicle in order thereby to propel the motor vehicle,
   the second drive output being designed to channel at least part of the drive torque from the power take-off device to an auxiliary unit thereby in order to drive the auxiliary unit,
   the clutch being designed for selectively coupling the drive input to the first drive output and the second drive output,
   the clutch being shiftable into first, second and third shift positions, such that:
      in the first shift position of the clutch, the drive input is coupled to the first drive output and the drive input is decoupled from the second drive output, and
      in the second shift position of the clutch, the drive input is coupled to the second drive output and the drive input is decoupled from the first drive output, and
      in the third shift position of the clutch, the drive input is coupled to both the first drive output and the second drive output,
   the drive input of the power take-off device is formed by a drive input shaft and the first drive output of the power take-off device is formed by a first drive output shaft and the second drive output of the power take-off device is formed by a second drive output shaft,
   a first gearwheel and a second gearwheel are provided for the transmission of torque from the drive input shaft to the second drive output shaft,
   the second gearwheel is permanently coupled to the first gearwheel,
   the first gearwheel is optionally coupled to and decoupled from the drive input shaft by the clutch,
   the second gearwheel is permanently coupled to the second drive output shaft,
   the first gearwheel is arranged coaxially on the drive input shaft, and
   the clutch is arranged axially between the first gearwheel and the first drive output shaft.

2. The power take-off device according to claim 1, wherein the clutch comprises a sliding sleeve which has three detent positions, and each of the three detent positions respectively corresponds to one of the first, the second and the third shift positions.

3. The power take-off device according to claim 1, wherein the power take-off device has a housing of its own, and the clutch and a power transmitting means are arranged inside the housing of the power take-off device for transmitting the drive torque from the drive input to the first and the second drive outputs.

4. The power take-off device according to claim 3, wherein either the housing of the power take-off device is designed to be fixed to a housing of a multi-gear transmission, or
   the housing of the power take-off device is designed to be fixed to a frame or a chassis of the motor vehicle to which the housing of the multi-gear transmission is also attached.

5. The power take-off device according to claim 4, wherein the power take-off device is designed to be arranged on an output side of the multi-gear transmission.

6. The power take-off device according to claim 1, wherein the power take-off device is designed to be accommodated inside a housing of a multi-gear transmission.

7. The power take-off device according to claim 6, wherein the multi-gear transmission comprises first and second spaces inside the housing thereof, the power take-off device is designed to be accommodated in the first space inside the housing of the multi-gear transmission, and
   transmission shifting elements and gearwheels, which produce various and selectively engagable gear ratio steps of the multi-gear transmission, are accommodated in the second space of the housing of the multi-gear transmission, and the first and the second spaces are separated from one another.

8. The power take-off device according to claim 1, wherein the first drive output of the power take-off device is formed by a first drive output shaft and the second drive output of the power take-off device is formed by a second drive output shaft, and
   the first drive output shaft and the second drive output shaft are arranged parallel to and laterally offset from one another.

9. A motor vehicle drive-train for driving propulsion means of a motor vehicle and for powering an auxiliary unit which is arrangable on the motor vehicle,
   a multi-gear transmission and a power take-off device for selectively driving the propulsion means and the auxiliary unit,
   the power take-off device comprising:
      a drive input,
      first and second drive outputs, and
      a clutch,
      the first drive output being designed to channel at least part of a drive torque from the power take-off device to the propulsion means of the motor vehicle in order thereby to propel the motor vehicle,
      the second drive output being designed to channel at least part of the drive torque from the power take-off device to the auxiliary unit thereby in order to drive the auxiliary unit,
      the clutch being designed for coupling the drive input selectively to the first drive output and the second drive output,
      the clutch being shiftable to first, second and third shift positions, such that:
         in the first shift position of the clutch, the drive input is coupled to the first drive output and the drive input is decoupled from the second drive output,
         in the second shift position of the clutch, the drive input is coupled to the second drive output and the drive input is decoupled from the first drive output, and in the third shift position of the clutch, the drive input is coupled to both the first drive output and the second drive output, the drive input of the power take-off device is formed by a drive input shaft and the first drive output of the power take-off device is formed by a first drive output shaft and the second drive output of the power take-off device is formed by a second drive output shaft, a first gearwheel and a second gearwheel are provided for the transmission of torque from the drive input shaft to the second drive output shaft, the second gearwheel is permanently coupled to the first gearwheel, the first gearwheel is optionally coupled to and decoupled from the drive input shaft by the clutch, the second gearwheel is permanently coupled to the second drive output shaft, the first gearwheel is arranged coaxially on the drive input shaft, and the clutch is arranged axially between the first gearwheel and the first drive output shaft.

* * * * *